United States Patent
Büttner et al.

(10) Patent No.: US 12,003,613 B2
(45) Date of Patent: Jun. 4, 2024

(54) METHOD FOR SYNCHRONIZING TIME IN AN ETHERNET-BASED NETWORK

(71) Applicant: Beckhoff Automation GmbH, Verl (DE)

(72) Inventors: Holger Büttner, Berlin (DE); Dirk Janssen, Verl (DE); Erik Vonnahme, Salzkotten (DE); Hans Beckhoff, Verl (DE); Thomas Rettig, Rheda-Wiedenbrück (DE); Thorsten Bunte, Gütersloh (DE); Johannes Beckhoff, Schloß Holte-Stukenbrock (DE); Guido Beckmann, Verl (DE); Karl Weber, Altdorf (DE)

(73) Assignee: Beckhoff Automation GmbH, Verl (DE)

( * ) Notice: Subject to any disclaimer, the term of this patent is extended or adjusted under 35 U.S.C. 154(b) by 85 days.

(21) Appl. No.: 17/685,978

(22) Filed: Mar. 3, 2022

(65) Prior Publication Data
US 2022/0271913 A1    Aug. 25, 2022

Related U.S. Application Data

(63) Continuation of application No. PCT/EP2020/074545, filed on Sep. 3, 2020.

(30) Foreign Application Priority Data

Sep. 23, 2019 (DE) .................... 10 2019 125 529.5

(51) Int. Cl.
*H04L 7/10* (2006.01)
*H04J 3/06* (2006.01)
(Continued)

(52) U.S. Cl.
CPC .............. *H04L 7/10* (2013.01); *H04J 3/0667* (2013.01); *H04L 7/0012* (2013.01); *H04L 2012/4026* (2013.01)

(58) Field of Classification Search
CPC . H04L 7/10; H04L 7/0012; H04L 2012/4026; H04J 3/0667
See application file for complete search history.

(56) References Cited

U.S. PATENT DOCUMENTS 8,630,314 B2   1/2014   York
9,571,215 B2 *  2/2017   Bock ..................... H04J 3/0673
(Continued)

FOREIGN PATENT DOCUMENTS

| CN | 102668424 A | 9/2012 |
| CN | 105519035 A | 4/2016 |
| CN | 106688207 A | 5/2017 |

OTHER PUBLICATIONS

Cho, Hyuntae et al. "Implementation of a PTP Bridge to Extend IEEE 1588 to Zigbee Networks," 2010 10th IEEE CIT International Conference, Jun. 29, 2010, pp. 2604-2611, 8 pages.
(Continued)

*Primary Examiner* — Chandrahas B Patel
(74) *Attorney, Agent, or Firm* — Dorsey & Whitney LLP

(57) ABSTRACT

A method for synchronizing time in an Ethernet-based network having a master network subscriber and a slave network subscriber includes sending out a first telegram via the master network subscriber, where the slave subscriber receives the first telegram at a first receipt time value of a local system time and stores the first receipt time value. The method can also include reading out the first receipt time value via the master subscriber, sending out a second telegram by the master subscriber, where the slave subscriber receives the second telegram at a second receipt time value of the local system time and stores the second receipt time
(Continued)

value, and reading out the second receipt time value via the master network subscriber. A speed parameter of the local system time can be calculated from the receipt time values via the master network subscriber, and transmitted to the slave subscriber.

15 Claims, 3 Drawing Sheets

(51) Int. Cl.
*H04L 7/00* (2006.01)
*H04L 12/40* (2006.01)

(56) References Cited

U.S. PATENT DOCUMENTS

| | | |
|---|---|---|
| 9,991,981 B2 | 6/2018 | Bunte et al. |
| 10,320,507 B2 | 6/2019 | Heine |
| 2011/0170534 A1 | 7/2011 | York |
| 2017/0195109 A1 | 7/2017 | Perez-Cruz et al. |
| 2017/0346588 A1 | 11/2017 | Prins et al. |
| 2018/0227068 A1 | 8/2018 | Stein et al. |
| 2018/0227080 A1 | 8/2018 | Stein et al. |
| 2020/0162234 A1* | 5/2020 | Almog ............... H04L 7/10 |
| 2022/0006548 A1* | 1/2022 | Xu ............... H04W 56/004 |

OTHER PUBLICATIONS

Office Action dated Sep. 23, 2019 in connection with German patent application No. 10 2019 125 529.5, 9 pages including English translation.

International Search Report and Written Opinion dated Dec. 3, 2020 in connection with PCT/EP2020/074545, 19 pages including English translation.

International Preliminary Report on Patentability dated Dec. 10, 2021 in connection with PCT/EP2020/07545, 52 pages including English translation.

"EtherCAT—the Ethernet Fieldbus," EtherCAT Technology Group, Nov. 2012, 21 pages.

Office Action dated Dec. 26, 2022 in connection with Chinese patent application No. 202080062736.5, 7 pages including English translation.

\* cited by examiner ized network. Such data networks may also be referred to as a field bus.

METHOD FOR SYNCHRONIZING TIME IN AN ETHERNET-BASED NETWORK

CROSS-REFERENCE TO RELATED APPLICATIONS

This patent application is a continuation of International Patent Application PCT/EP2020/074545, "Method for Time Synchronization in an Ethernet-Based Network," filed 3 Sep. 2020, which claims the priority of German patent application DE 10 2019 125 529.5, "Verfahren zur Zeitsynchronisation in einem Ethernet-basierten Netzwerk," filed 23 Sep. 2019, each of which is incorporated by reference herein, in the entirety and for all purposes.

FIELD

The present invention relates to a method for synchronizing time in an Ethernet-based network.

BACKGROUND

Data networks are known from the prior art. Prior art wired data networks are frequently based on the Ethernet standard. The generic term "Industrial Ethernet in the prior art knowledge refers to the use of Ethernet data networks for networking devices in industrial manufacturing and automation technology. Such data networks may e.g. be based on the EtherCAT standard. Such data networks may also be referred to as a field bus.

For certain control tasks, it is necessary that all devices involved in said control task and networked via a field bus use the same clock time. For example, it may be required that the clock times of the individual devices should not deviate from one another by more than 1 µs. To ensure this, it is known to perform cyclic time synchronization on field buses.

In Ethernet-based networks with time synchronization according to the prior art, it is known to perform a large number of a plurality of thousand synchronization steps during an initialization phase of the network in order to adjust the speed of the timers of the individual subscribers of the network to a predetermined reference in the sense of a closed-loop control.

US 2017/0346588 A1 describes a method for synchronizing the clocks of network subscribers, each of which comprising at least one clock. Synchronization is performed via a plurality of synchronization messages.

US 2017/0195109 A1 describes a clock synchronization method in which a clock offset is determined based on measured transmission and receipt times.

SUMMARY

The present invention provides a method for synchronizing time in an Ethernet-based network.

According to one aspect, a method for synchronizing time in an Ethernet-based network comprising at least a master network subscriber and a slave network subscriber includes the steps of: sending out a first telegram by the master network subscriber, wherein the slave network subscriber receives the first telegram at a first receipt time value of a local system time of the slave network subscriber and stores the first receipt time value, reading out the first receipt time value by the master network subscriber, sending out a second telegram by the master network subscriber, wherein the slave network subscriber receives the second telegram at a second receipt time value of the local system time of the slave network subscriber and stores the second receipt time value, reading out the second receipt time value by the master network subscriber, calculating a speed parameter of the local system time of the slave network subscriber from the receipt time values by the master network subscriber, and transmitting the speed parameter to the slave network subscriber.

According to one aspect, a method for synchronizing time in an Ethernet-based network comprising at least a master network subscriber, a slave network subscriber and a further slave network subscriber includes the steps of: sending out a first telegram by the master network subscriber, wherein the slave network subscriber receives the first telegram at a first receipt time value of a local system time of the slave network subscriber and stores the first receipt time value, wherein the further slave network subscriber receives the first telegram at a further first receipt time value of a local system time of the further slave network subscriber and stores the further first receipt time value, reading out the first receipt time value and the further first receipt time value by the master subscriber.

The method can also include sending out a second telegram by the master network subscriber, wherein the slave network subscriber receives the second telegram at a second receipt time value of the local system time of the slave network subscriber and stores the second receipt time value, wherein the further slave network subscriber receives the second telegram at a further second receipt time value of a local system time of the further slave network subscriber and stores the further second receipt time value, reading out the second receipt time value and the further second receipt time value by the master network subscriber, calculating a speed parameter of the local system time of the slave network subscriber, the master network subscriber using the first receipt time value and the second receipt time value, wherein the master network subscriber calculates a further speed parameter of the local system time of the further slave network subscriber from the further receipt time values, transmitting the speed parameter to the slave network subscriber and the further speed parameter to the further slave network subscriber.

EXAMPLES

A method for synchronizing time in an Ethernet-based network comprising at least a master network subscriber and a slave network subscriber includes the steps of: sending out a first telegram by the master network subscriber, wherein the slave network subscriber receives the first telegram at a first receipt time value of a local system time of the slave network subscriber and stores the first receipt time value, reading out the first receipt time value by the master network subscriber, sending out a second telegram by the master network subscriber, wherein the slave network subscriber receives the second telegram at a second receipt time value of the local system time of the slave network subscriber and stores the second receipt time value, reading out the second receipt time value by the master network subscriber, calculating a speed parameter of the local system time of the slave network subscriber from the receipt time values by the master network subscriber and transmitting the speed parameter to the slave network subscriber.

Advantageously, this method allows for a direct measurement of a speed deviation of the local system time of the slave network subscriber and thus a direct and very accurate adjustment of the speed of the local system time of the slave network subscriber. Thus, the method advantageously allows a very fast correction of a speed deviation of the local system time of the slave network subscriber.

In an embodiment of the method, the network comprises a reference time provider. In this case, the reference time provider receives the first telegram at a first reference time value of a local system time of the reference time provider and stores the first reference time value. The first reference time value is read out by the master network subscriber. The reference time provider receives the second telegram at a second reference time value of the local system time of the reference time provider and stores the second reference time value. The second reference time value is also read out by the master network subscriber. Subsequently, the speed parameter is calculated from the first and second receipt time values and the first and second reference time values. If the receipt time values are further apart than the reference time values, the local system time of the slave network subscriber runs too fast. If the difference between the receipt time values is smaller than the difference between the reference time values, the local system time of the slave network subscriber runs off too slowly. A slave network subscriber of the network may e.g. act as the network reference time provider, in particular the first slave network subscriber in the network.

In another embodiment of the method, the master network subscriber transmits the first telegram at a first reference time value of a system time of the master network subscriber. The master network subscriber transmits the second telegram at a second reference time value of the system time of the master network subscriber. Thereby, the speed parameter is calculated from the receipt time values and the reference time values. In this embodiment, the master network subscriber itself acts as the network's reference time provider.

In an embodiment of the method, the master network subscriber calculates a reference time difference as the difference between the first reference time value and the second reference time value and a receipt time difference as the difference between the first receipt time value and the second receipt time value. Thereby, the master network subscriber calculates the speed parameter from the reference time difference and the receipt time difference. Advantageously, by comparing the reference time difference and the receipt time difference, it may be determined not only whether the local system time of the slave network subscriber runs too fast or too slowly. It may also be calculated directly by which factor the running speed of the local system time deviates from the desired reference value. Advantageously, this enables direct and very accurate correction of the speed of the local system time of the slave network subscriber.

In an embodiment of the method, the network comprises a further slave network subscriber. The further slave network subscriber receives the first telegram at a further first receipt time value of a local system time of the further slave network subscriber and stores the further first receipt time value. The further first receipt time value is read out by the master network subscriber. The further slave network subscriber receives the second telegram at a further second receipt time value of the local system time of the further slave network subscriber and stores the further second receipt time value. The further second receipt time value, too, is read out by the master network subscriber.

Then the master network subscriber calculates a further speed parameter of the local system time of the further slave network subscriber from the further receipt time values and transmits the further speed parameter to the further slave network subscriber. Advantageously, the method thus also enables correction of the speed of the local system time of the further slave network subscriber. In an analogous manner, the method may also be carried out for a plurality of further slave network subscribers of the network. A particular advantage is that the recording of the respective first receipt time values and second receipt time values for a plurality of slave network subscribers may be triggered jointly by the first telegram and the second telegram. Advantageously, this allows the procedure to be carried out particularly quickly and with particularly little effort.

In an embodiment of the method, the second telegram is transmitted between 0.1 seconds and 10 seconds after the first telegram, preferably between 0.2 seconds and 5 seconds after the first telegram. This advantageously ensures that any speed deviation of the local system time of the slave network subscriber has a sufficiently strong effect on the time difference between the first receipt time value and the second receipt time value to enable accurate correction of the speed of the local system time of the slave network subscriber. At the same time, the time elapsing between the transmission of the first telegram and of the second telegram is sufficiently short in this method to enable fast initialization of the network.

In an embodiment of the method, the first receipt time value is read out by the master network subscriber sending out a first read-out telegram. The second receipt time value is read out by the master network subscriber sending out a second read-out telegram. If the network comprises a plurality of slave network subscribers involved in the method, the first receipt time values of a plurality of slave network subscribers may be read out together by via the first read-out telegram, which advantageously enables particularly fast execution of the method. This applies accordingly to the second receipt time values of the multiple slave network subscribers. However, it is also possible to read out the receipt time values of all slave network subscribers with separate read-out telegrams in each case.

In an embodiment of the method, the speed parameter is transmitted by the master network subscriber sending out a transmission telegram. If the network comprises a plurality of slave network subscribers involved in the method, the speed parameters of a plurality of slave network subscribers may be jointly transmitted by only one transmission telegram, which advantageously allows for a particularly fast execution of the method. However, it is also possible to transmit the speed parameters of the plurality of slave network subscribers with their own respective transmission telegrams.

In an embodiment of the method, this is performed during initialization of the network. Advantageously, it may thus already be ensured during initialization of the network that the speed of the local system time of the slave network subscriber is very close to a predefined ideal value.

In an embodiment of the method, the speed parameter is stored in a non-volatile data memory of the master network subscriber. This allows for transmitting the speed parameter to the slave network subscriber during a re-initialization of the network without prior measurement. This allows for even faster initialization of the network if the speed parameter has already been determined during a previous initialization of the network.

In an embodiment of the method, the network is an EtherCAT network. In this case, the first telegram and the second telegram may be EtherCAT telegrams.

BRIEF DESCRIPTION OF THE DRAWINGS

The invention is described in more detail below with reference to figures, is which.

DETAILED DESCRIPTION

Figure 1:
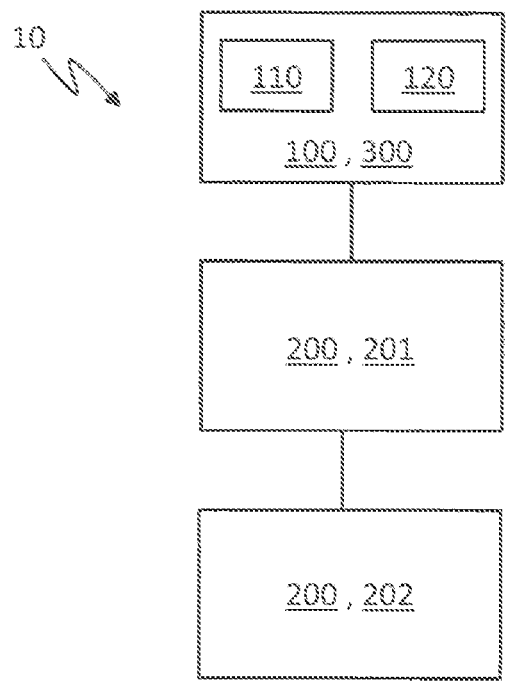
FIG. 1 is a schematic depiction of a network comprising a master network subscriber and a plurality of slave network subscribers.

FIG. 1 shows a schematic diagram of an exemplary network 10. The network 10 is an Ethernet-based network and may e.g. be used for control and automation purposes. The network 10 may also be referred to as a field bus. The network 10 may e.g. be an EtherCAT network.

The network 10 comprises a master network subscriber 100 and a plurality of slave network subscribers 200. In the example shown in FIG. 1, a first slave network subscriber 200, 201 and a second slave network subscriber 200, 202 are provided. However, the network 10 may have a different number of slave network subscribers 200, e.g. only the first slave network subscriber 200, 201 or more than two slave network subscribers 200.

The network 10 shown in FIG. 1 has a line topology. The master network subscriber 100 is connected to the first slave network subscriber 200, 201. The first slave network subscriber 200, 201 is connected to the second slave network subscriber 200, 202. However, the network 10 could also have a different topology. For example, the network 10 could also have branches.

The master network subscriber 100 performs a guiding function in the network 10. For example, the master network subscriber 100 sends out telegrams (data telegrams) that circulate within the network 10. Such telegrams may e.g. pass through all slave network subscribers 200 of the network 10 and then return to the master network subscriber 100.

Figure 2:
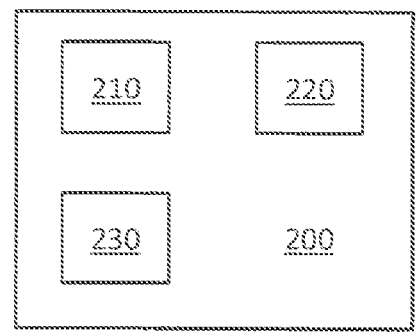
FIG. 2 is a schematic depiction of a slave network subscriber of the network.

FIG. 2 shows a schematic depiction of an exemplary slave network subscriber 200. All slave network subscribers 200 of the network 10 are embodied like the slave network subscriber 200 of FIG. 2, i.e. they each at least have the components shown in FIG. 2.

Each slave network subscriber 200 has a respective local system time 210. For example, the local system time 210 may be a numerical value indicating a period of time elapsed since a specified start time. For example, the local system time 210 may indicate the number of nanoseconds elapsed since 1 Jan. 2000, 00:00.

Each slave network subscriber 200 independently increments its local system time 210 based on an internal clock of the respective slave network subscriber 200, with each slave network subscriber 200 having at least one speed parameter 230 that influences the speed at which the respective slave network subscriber 200 increments its local system time 210. For example, the speed parameter 230 may indicate how often the local system time 210 must be incremented by a deviating value of e.g. 9 ns or 11 ns, instead of by a control value of e.g. 10 ns, in order to average the desired speed of increment of the local system time 210 over a longer period of time. The speed at which the local system time 210 increases may also be referred to as the speed of increase of the local system time 210.

Additionally, each slave network subscriber 200 includes a register 220 in which the slave network subscriber 200 may store a current value of the local system time 210 of the slave network subscriber 200 upon request.

It is necessary that the local system time 210 of each slave network subscriber 200 of the network 10 match a predetermined reference time of the network 10 as closely as possible and progress at the same speed as the reference time as closely as possible. For this purpose, after the network 10 is put into operation, the master network subscriber 100 performs an initialization of the network 10 during which the absolute values and the gait speeds of the local system times 210 of the individual slave network subscribers 200 are adjusted to the predetermined reference time of the network 10. In this case, the adjustment of the speed of the local system time 210 of each slave network subscriber 200 is performed by the time synchronization method described below, in which the master network subscriber 100 determines the speed parameter 230 for each slave network subscriber 200 of the network 10 involved in the initialization and transmits it to the respective slave network subscriber 200. Even after initialization of the network 10, the speed parameters 230 of the individual slave network subscribers 200 may still be periodically readjusted during regular operation of the network 10.

In the network 10 shown in FIG. 1, the master network subscriber 100 acts as the reference time provider 300 of the network 10. For this purpose, the master network subscriber 100 has a system time 110 that is the reference time of the network 10.

Figures 3, 4:
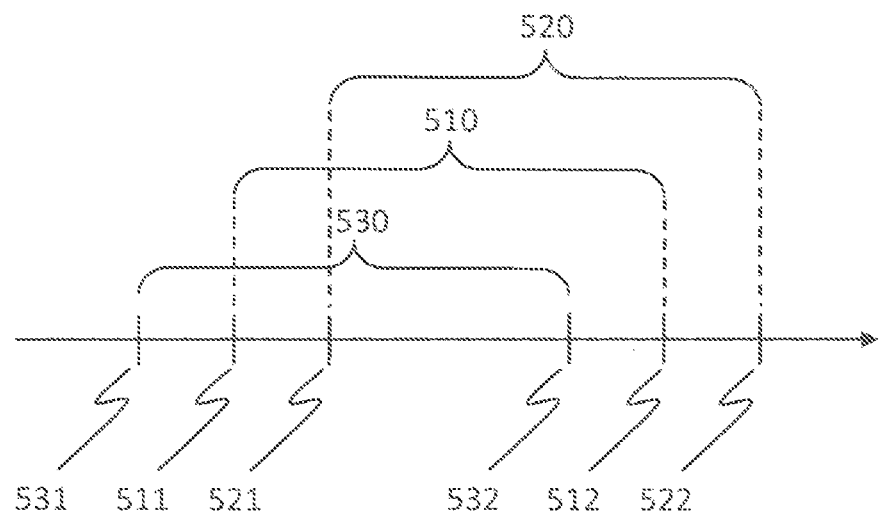
FIG. 3 is a schematic depiction of a plurality of successively transmitted telegrams.
FIG. 4 is a timeline illustrating receipt time values and reference time values.

For synchronizing time, the master network subscriber 100 transmits a first telegram 410 schematically shown in FIG. 3. The master network subscriber 100 transmits the first telegram 410 at a point in time when the system time 110 has a first reference time value 531. The first reference time value 531 is shown schematically on a time line in FIG. 4. The first reference time value 531 is stored in the master network subscriber 100.

The first slave network subscriber 200, 201 receives the first telegram 410 at a point in time when the local system time 210 of the first slave network subscriber 200, 201 has a first receipt time value 511. The timeline of FIG. 4 illustrates that the time at which the local system time 210 of the first slave network subscriber 200, 201 has the first receipt time value 511 is after the time at which the system time 110 of the master network subscriber 100 has the first reference time value 531. The first slave network subscriber 200, 201 stores the first receipt time value 511 of the first slave network subscriber 200, 201 in its register 220.

The second slave network subscriber 200, 202 receives the first telegram 410 at a subsequent time at which the local system time 210 of the second slave network subscriber 200, 202 has a first receipt time value 521. The first receipt time value 521 of the second slave network subscriber 200, 202 is also schematically shown in FIG. 4. The second slave network subscriber 200, 202 stores this first receipt time value 521 of the second slave network subscriber 200, 202 in its register 220.

If the network 10 comprised further slave network subscribers 200, these would receive the first telegram 410 in each case at a point in time at which the local system time 210 of the respective slave network subscriber 200 has a respective first receipt time value, as well. The respective slave network subscribers 200 would store this respective first receipt time value in their respective register 220.

After the first telegram 410 has passed through all slave network subscribers 200 of the network 10 participating in the time synchronization method, the master network subscriber 100 reads out the first receipt time values 511, 521 stored in the registers 220 of the slave network subscribers 200. This may e.g. be carried out by the master network subscriber 100 transmitting a first read-out telegram 415 shown schematically in FIG. 3. All slave network subscribers 200 of network 10 participating in the time synchronization method each insert the first receipt time value 511, 521 stored in their respective register 220 into the first read-out telegram 415. After first read-out telegram 415 has returned to the master network subscriber 100, the master network subscriber 100 reads the first receipt time values 511, 521 from the first read-out telegram 415 and stores them.

Alternatively, it would be possible to read out the first receipt time values 511, 521 of the individual slave network subscribers 200 via individual first read-out telegrams 415 in each case. In this case, the master network subscriber 100 transmits a separate first read-out telegram 415 for each slave network subscriber 200.

At a later point in time when the system time 110 of the master network subscriber 100 has a second reference time value 532, the master network subscriber 100 transmits a second telegram 420 shown schematically in FIG. 3. The second telegram 420 may e.g. be sent out between 0.1 seconds and 10 seconds after sending out the first telegram 410, in particular e.g. between 0.2 seconds and 5 seconds after sending out the first telegram 410. It is suitable to send the second telegram 420 about 1 second after sending the first telegram 410. The second reference time value 532 is shown schematically in FIG. 4.

The first slave network subscriber 200, 201 receives the second telegram 420 at a point in time when the local system time 210 of the first slave network subscriber 200, 201 has a second receipt time value 512. The first slave network subscriber 200, 201 stores the second receipt time value 512 in its register 220.

The second slave network subscriber 200, 202 receives the second telegram 420 at a subsequent point in time at which the local system time 210 of the second slave network subscriber 200, 202 has a second receipt time value 522. The second slave network subscriber 200, 202 stores the second receipt time value 522 in its register 220.

The second receipt time value 512 of the first slave network subscriber 200, 201 and the second receipt time value 522 of the second slave network subscriber 200, 202 are shown schematically in FIG. 4.

Further slave network subscribers 200, if present, receive the second telegram 420 in each case at a point in time at which the local system time 210 of the respective slave network subscriber 200 has a second receipt time value. The further slave network subscribers 200 store the respective second receipt time value in their respective register 220.

Subsequently, the master network subscriber 100 reads out the second receipt time values 512, 522 stored in the registers 220 of the slave network subscribers 200. This may e.g. be done analogously to reading out the first receipt time values 511, 521 by sending a second read-out telegram 425 shown schematically in FIG. 3.

An alternative option is to jointly read out the first receipt time values 511, 521 and the second receipt time values 512, 522 of the individual slave network subscribers 200. This requires the slave network subscribers 200 to store the respective first receipt time values 511, 521 and the respective second receipt time values 512, 522 in separate registers. Then, the first receipt time values 511, 521 and the second receipt time values 512, 522 of the individual slave network subscribers 200 may be jointly read out by the second read-out telegram 425. The transmission of the first read-out telegram 415 may be omitted in this case.

Another alternative possibility is that the slave network subscriber 200 stores the first receipt time values 511, 521 directly in the first telegram 410 and the second receipt time values 512, 522 directly in the second telegram 420. In this case, the master network subscriber 100 reads out the first receipt time values 511, 521 directly via the first telegram 410 and the second receipt time values 512, 522 directly via of the second telegram 420. Sending out the first read-out telegram 415 and the second read-out telegram 425 may then be omitted. Likewise, it is then not necessary for the slave network subscribers 200 to store their respective first receipt time values 511, 521 in their respective register 220 and to store their respective second receipt time values 512, 522 in their respective register 220.

Subsequently, the first reference time value 531 and the second reference time value 532, the first receipt time value 511 and the second receipt time value 512 of the first slave network subscriber 200, 201, the first receipt time value 521 and the second receipt time value 522 of the second slave network subscriber 200, 202, and possibly the first and second receipt time values of further slave network subscribers 200 are available in the master network subscriber 100. From this, the master network subscriber 100 may calculate the speed parameter 230 for each slave network subscriber 200 in such a way that the local system time 210 of the respective slave network subscriber 200 runs with the greatest possible accuracy at the same speed as the system time 110 of the master network subscriber 100 forming the reference time of the network 10.

The calculation of the speed parameter 230 is based in each case on the insight that e.g. in case of the first slave network subscriber 200, 201, the time difference between the first receipt time value 511 and the second receipt time value 512 would be the same as the time difference between the first reference time value 531 and the second reference time value 532 if the local system time 210 of the first slave network subscriber 200, 201 was already running at the same speed as the system time 110 of the master network subscriber 100.

Therefore, to calculate the speed parameter 230 for each slave network subscriber 200, the master network subscriber 100 may e.g. calculate a reference time difference 530 as the difference between the first reference time value 531 and the second reference time value 532, i.e. by subtracting the first reference time value 531 from the second reference time value 532. Furthermore, the master network subscriber 100 may calculate a receipt time difference 510 for the first slave network subscriber 200, 201 as the difference between the first receipt time value 511 of the first slave network subscriber 200, 201 and the second receipt time value 512 of the first slave network subscriber 200, 201.

Accordingly, the master network subscriber 100 may calculate a receipt time difference 520 for the second slave network subscriber 200, 202 as the difference between the first receipt time value 521 of the second slave network subscriber 200, 202 and the second receipt time value 522 of the second slave network subscriber 200, 202. Similarly, the master network subscriber 100 may calculate further receipt time differences for further slave network subscribers 200 of the network 10. The reference time difference 530, the receipt time difference 510 of the first slave network subscriber 200, 201 and the receipt time difference 520 of the second slave network subscriber 200, 202 are shown in FIG. 4.

If the receipt time difference 510 of the first slave network subscriber 200, 201 is larger than the reference time difference 530, the local system time 210 of the first slave network subscriber 200, 201 runs faster than the system time 110 of the master network subscriber 100 and must be slowed down by adjusting the speed parameter 230 of the first slave network subscriber 200, 201. On the other hand, if the receipt time difference 510 of the first slave network subscriber 200, 201 is smaller than the reference time difference 530, the local system time 210 of the first slave network subscriber 200, 201 elapses slower than the system time 110 of the master network subscriber 100 and must be accelerated. The magnitude of the deviation between the receipt time difference 510 and the reference time difference 530 is thereby proportional to the deviation between the speeds of the local system time 210 of the first slave network subscriber 200, 201 and the system time 110 of the master network subscriber 100. From this, the speed parameter 230 for the first slave network subscriber 200, 201 may be calculated. Accordingly, the speed parameter 230 may also be calculated for the other slave network subscribers 200.

After calculating the speed parameter 230 for each slave network subscriber 200 of the network 10 involved in the synchronization process, the master network subscriber 100 transmits the respective speed parameter 230 to each involved slave network subscriber 200 of the network 10. Thus, the speed parameter 230 calculated for the first slave network subscriber 200, 201 is transmitted to the first slave network subscriber 200, 201. The speed parameter 230 calculated for the second slave network subscriber 200, 202 is transmitted to the second slave network subscriber 200, 202.

The speed parameter 230 may be transmitted in each case by sending out a transmission telegram 430 shown schematically in FIG. 3. The respective speed parameter 230 is transmitted to the respective slave network subscriber 200 via the transmission telegram 430. It is possible to transmit the respective speed parameter 230 for a plurality of slave network subscribers 200 involved in the time synchronization method simultaneously with only one transmission telegram 430. However, it is also possible to transmit the speed parameter 230 for each slave network subscriber 200 with a respective separate transmission telegram 430.

The master network subscriber 100 may store the calculated speed parameters 230 of all slave network subscribers 200 of the network 10 participating in the time synchronization process in a non-volatile data memory 120 of the master network subscriber 100 and/or in the respective slave network subscribers 200. This allows for the master network subscriber 100 to read out the speed parameters 230 of the slave network subscribers 200 stored in the non-volatile data memory 120 after a renewed start-up of the network 10 and to transmit them directly to the slave network subscribers 200. In this case, the method steps described above for sending out the first telegram 410, for reading out the first receipt time values 511, 521, for sending out the second telegram 420, for reading out the second receipt time values 512, 522 and for calculating the speed parameter 230 for each slave network subscriber 200 may be dispensed with. This may speed up the initialization of the network 10 when the network 10 is put into operation again. However, storing the calculated speed parameter 230 in the non-volatile data memory 120 of the master network subscriber 100 may also be omitted.

Figure 5:
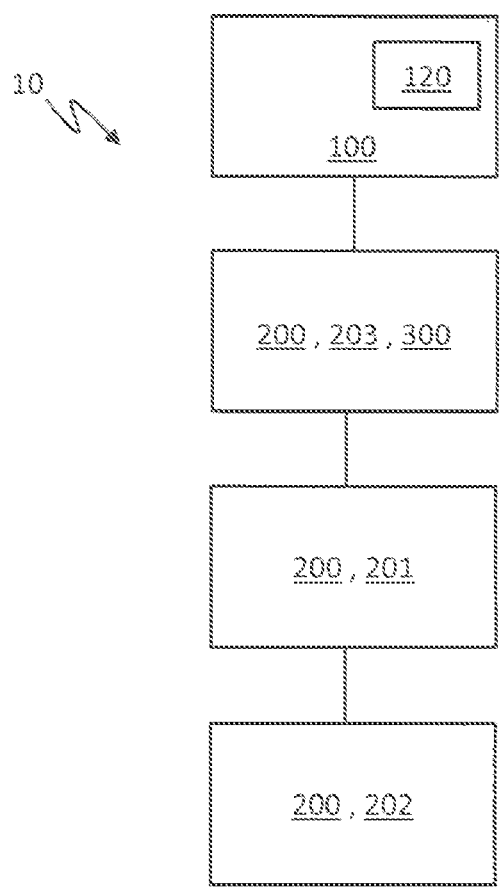
FIG. 5 is a schematic depiction of another variant of the network.

FIG. 5 shows a schematic representation of an alternative embodiment of the network 10. In the variant of the network 10 shown in FIG. 5, the master network subscriber 100 does not act as the reference time provider 300. Instead, compared to the variant of the network 10 shown in FIG. 1, an additional slave network subscriber 200, 203 is present, which acts as the reference time provider 300. Compared to the variant of the network 10 shown in FIG. 1, the additional slave network subscriber 200, 203 has been inserted between the master network subscriber 100 and the first slave network subscriber 200, 201. As a result, the additional slave network subscriber 200, 203 forms the first slave network subscriber 200 following the master network subscriber 100 in the line topology of the network 10. However, the additional slave network subscriber 200, 203 could also be inserted at any other position in the network 10. The additional slave network subscriber 200, 203 is embodied like the other slave network subscribers 200 of the network 10.

The additional slave network subscriber 200, 203 acts as a reference time provider 300 of the network 10, which means that the local system time 210 of the additional slave network subscriber 200, 203 is the reference time of the network 10. The respective local system time 210 of each additional slave network subscriber 200 of the network 10 is to be synchronized with the local system time 210 of the additional slave network subscriber 200, 203 acting as the reference time provider 300. As the local system time 210 of the additional slave network subscriber 200, 203 is itself the reference time of the network 10, the local system time 210 of the additional slave network subscriber 200, 203 need not be synchronized with the reference time. Therefore, it is not necessary to adjust the speed parameter 230 of the additional slave network subscriber 200, 203.

The respective speed parameters 230 of the remaining slave network subscribers 200 of the network 10 are determined during the initialization of the network 10 by the time synchronization method already described above. However, since in the variant of the network 10 shown in FIG. 5 the additional slave network subscriber 200, 203 acts as a reference time provider 300, the first reference time value 531 and the second reference time value 532 in the variant of the network 10 shown in FIG. 5 must be determined in a somewhat different manner than described above. In the following, it is described how the method for synchronizing time in its application in the variant of the network 10 shown in FIG. 5 differs from the application described above in the variant of the network 10 shown in FIG. 1.

In the variant of the network 10 shown in FIG. 5, the master network subscriber 100 first sends out the first telegram 410. The additional slave network subscriber 200, 203 acting as reference time provider 300 receives the first telegram 410 at a point in time when the local system time 210 of the additional slave network subscriber 200, 203 acting as reference time has a first reference time value 531. This first reference time value 531 is stored by the additional slave network subscriber 200, 203 acting as reference time provider 300 in its register 220.

Subsequently, the first slave network subscriber 200, 201, the second slave network subscriber 200, 202 and any other slave network subscriber 200 of the network 10 involved in the time synchronization method receive the first telegram 410 and store the respective first receipt time values 511, 521 in their respective register 220 in the manner described above.

Subsequently, the first reference time value 531 stored in the reference time provider 300 is read out by the master network subscriber 100 in the same way as the first receipt time values 511, 521 stored in the other slave network subscribers 200. This may e.g. be done via the first read-out telegram 415.

Later, the master network subscriber 100 transmits the second telegram 420. The additional slave network subscriber 200, 203 acting as reference time provider 300 receives the second telegram 420 at a point in time when the local system time 210 of the additional slave network subscriber 200, 203 representing the reference time of the network 10 comprises a second reference time value 532. The additional slave network subscriber 200, 203 acting as a reference time provider 300 stores the second reference time value 532 in its register 220.

Subsequently, the first slave network subscriber 200, 201, the second slave network subscriber 200, 202, and any other slave network subscriber 200 of the network 10 involved in the time synchronization method receive the second telegram 420 and each store the second receipt time values 512, 522 in their respective register 220, as has been described above.

Subsequently, the master network subscriber 100 reads out the second reference time value 532 stored in the reference time provider 300 in exactly the same way as the second receipt time values 512, 522 stored in the other slave network subscribers 200 are read out. This may e.g. be done via the second read-out telegram 425.

As a result, the master network subscriber 100 is now also aware of the first reference time value 531 and the second reference time value 532 in the variant of the network 10 shown in FIG. 5. In addition, the master network subscriber 100 again knows the first receipt time value 511 of the first slave network subscriber 200, 201, the second receipt time value 512 of the first slave network subscriber 200, 201, the first receipt time value 521 of the second slave network subscriber 200, 202, the second receipt time value 522 of the second slave network subscriber 200, 202 and the first and second receipt time values of all further slave network subscribers 200 of the network 10 participating in the time synchronization method. From this, the master network subscriber 100 may calculate the respective speed parameter 230 for each slave network subscriber 200 participating in the time synchronization method in the manner described above and subsequently transmit this to the respective slave network subscriber 200.

The calculated speed parameters 230 may optionally be stored again in the non-volatile data memory 120 of the master network subscriber 100, to be read out and transmitted to the slave network subscribers 200 during a subsequent restart of the network 10.

In the variant of the network 10 shown in FIG. 5, the master network subscriber 100 may also participate in the synchronization method and synchronize its system time with the reference time provider. For this purpose, it must store its transmission time values of the first telegram 410 and the second telegram 420. Calculation of the speed parameter for the master network subscriber 100 is then performed as described above, with the transmission time values being used instead of the aforementioned receipt time values.

The invention claimed is:

1. A method for synchronizing time in an Ethernet-based network having at least a master network subscriber and a slave network subscriber, the method comprising:
    sending out a first telegram by the master network subscriber, wherein the slave network subscriber receives the first telegram at a first receipt time value of a local system time of the slave network subscriber and stores the first receipt time value;
    reading out the first receipt time value by the master subscriber;
    sending out a second telegram by the master network subscriber, wherein the slave network subscriber receives the second telegram at a second receipt time value of the local system time of the slave network subscriber and stores the second receipt time value;
    reading out the second receipt time value by the master network subscriber;
    calculating a speed parameter of the local system time of the slave network subscriber, the master network subscriber using the first receipt time value and the second receipt time value; and
    transmitting the speed parameter to the slave network subscriber;
    wherein the second telegram is sent out between 0.1 seconds and 10 seconds after the first telegram.

2. The method according to claim 1,
    wherein the network comprises a further slave network subscriber,
    wherein the further slave network subscriber receives the first telegram at a further first receipt time value of a local system time of the further slave network subscriber and stores the further first receipt time value,
    wherein the further first receipt time value is read out by the master network subscriber,
    wherein the further slave network subscriber receives the second telegram at a further second receipt time value of the local system time of the further slave network subscriber and stores the further second receipt time value,
    wherein the further second receipt time value is read out by the master network subscriber,
    wherein the master network subscriber calculates a further speed parameter of the local system time of the further slave network subscriber from the further receipt time values, and
    wherein the further speed parameter is transmitted to the further slave network subscriber.

3. The method of claim 1, wherein the second telegram is sent out between 0.2 seconds and 5 seconds after the first telegram.

4. A method for synchronizing time in an Ethernet-based network having at least a master network subscriber, a slave network subscriber and a further slave network subscriber, the method comprising:
    sending out a first telegram by the master network subscriber, wherein the slave network subscriber receives the first telegram at a first receipt time value of a local system time of the slave network subscriber and stores the first receipt time value;
    wherein the further slave network subscriber receives the first telegram at a further first receipt time value of a local system time of the further slave network subscriber and stores the further first receipt time value;
    reading out the first receipt time value and the further first receipt time value by the master subscriber;

sending out a second telegram by the master network subscriber, wherein the slave network subscriber receives the second telegram at a second receipt time value of the local system time of the slave network subscriber and stores the second receipt time value;

wherein the further slave network subscriber receives the second telegram at a further second receipt time value of a local system time of the further slave network subscriber and stores the further second receipt time value;

reading out the second receipt time value and the further second receipt time value by the master network subscriber;

calculating a speed parameter of the local system time of the slave network subscriber, the master network subscriber using the first receipt time value and the second receipt time value;

wherein the master network subscriber calculates a further speed parameter of the local system time of the further slave network subscriber from the further receipt time values; and transmitting the speed parameter to the slave network subscriber and the further speed parameter to the further slave network subscriber.

5. The method according to claim 4, wherein the master network subscriber calculates a reference time difference as a difference between the first reference time value and the second reference time value and calculates a receipt time difference as a difference between the first receipt time value and the second receipt time value, and wherein the master network subscriber calculates the speed parameter from the reference time difference and the receipt time difference.

6. The method according to claim 4, wherein the second telegram is sent out between 0.1 seconds and 10 seconds after the first telegram.

7. The method of claim 6, wherein the second telegram is sent out between 0.2 seconds and 5 seconds after the first telegram.

8. The method according to claim 4, wherein transmitting the speed parameter is carried out by the master network subscriber by sending out a transmission telegram.

9. The method according to claim 4, wherein the method is carried out during initialization of the network.

10. The method according to claim 4, wherein the speed parameter is stored in a non-volatile data memory of the master network subscriber.

11. The method according to claim 4, wherein the network is an EtherCAT network.

12. The method according to claim 4, wherein the network comprises a reference time provider, wherein the reference time provider receives the first telegram at a first reference time value of a local system time of the reference time provider and stores the first reference time value, wherein the first reference time value is read out by the master network subscriber, wherein the reference time provider receives the second telegram at a second reference time value of a local system time of the reference time provider and stores the second reference time value, wherein the second reference time value is read out by the master network subscriber, and wherein the speed parameter is calculated from the receipt time values and the reference time values.

13. The method according to claim 4, wherein the master network subscriber sends out the first telegram at a first reference time value of a system time of the master network subscriber, wherein the master network subscriber sends out the second telegram at a second reference time value of the system time of the master network subscriber, and wherein the speed parameter is calculated from the receipt time values and the reference time values.

14. The method according to claim 4, wherein reading out of the first receipt time value is carried out by the master network subscriber by sending out a first read-out telegram, and wherein reading out of the second receipt time value is carried out by the master network subscriber by sending out a second read-out telegram.

15. A method for synchronizing time in an Ethernet-based network having at least a master network subscriber and a slave network subscriber, the method comprising:

sending out a first telegram by the master network subscriber, wherein the slave network subscriber receives the first telegram at a first receipt time value of a local system time of the slave network subscriber and stores the first receipt time value;

reading out the first receipt time value by the master subscriber;

sending out a second telegram by the master network subscriber, wherein the slave network subscriber receives the second telegram at a second receipt time value of the local system time of the slave network subscriber and stores the second receipt time value;

reading out the second receipt time value by the master network subscriber;

calculating a speed parameter of the local system time of the slave network subscriber, the master network subscriber using the first receipt time value and the second receipt time value; and transmitting the speed parameter to the slave network subscriber;

wherein reading out of the first receipt time value is carried out by the master network subscriber by sending out a first read-out telegram, and wherein reading out of the second receipt time value is carried out by the master network subscriber by sending out a second read-out telegram.

* * * * *